United States Patent [19]
Hart et al.

[11] Patent Number: 4,809,265
[45] Date of Patent: Feb. 28, 1989

[54] METHOD AND APPARATUS FOR INTERFACING TO A LOCAL AREA NETWORK

[75] Inventors: John H. Hart, San Jose; Frederick J. Baker, Santa Clara, both of Calif.

[73] Assignee: Vitalink Communications Corporation, Fremont, Calif.

[21] Appl. No.: 44,964

[22] Filed: May 1, 1987

[51] Int. Cl.$^4$ .............................................. H04J 3/02
[52] U.S. Cl. .................................................... 370/85
[58] Field of Search ................. 370/85, 88; 340/825.5, 340/825.05

[56] References Cited

U.S. PATENT DOCUMENTS 4,568,930 2/1986 Livingston et al. ................... 370/85
4,635,254 1/1987 Tulpule et al. ......................... 370/85
4,700,185 10/1987 Balph et al. ............................ 370/85

Primary Examiner—Robert L. Griffin
Assistant Examiner—Frank M. Scutch, III
Attorney, Agent, or Firm—Donald C. Feix

[57] ABSTRACT

A controller for a bridge interconnecting local area networks operates in two modes. In a first mode the controller receives and transmits station data frames with previously appended frame check sums. In a second mode the controller responds to requests for information from stations by generating data frames from an associated memory. The controller computes and appends frame check sums and then transmits the frames and check sums to the requesting station. The controller is constructed and is effective to operate in a way which insures that all station data frames transmitted from stations to the bridge are received by the bridge without interruption or loss during all periods of operation. The controller receives all such frames at all times, including the time intervals during which circuitry in the controller must be off line and reprogrammed for changing operation between the first and second modes.

6 Claims, 12 Drawing Sheets

METHOD AND APPARATUS FOR INTERFACING TO A LOCAL AREA NETWORK

BACKGROUND OF THE INVENTION

This invention relates to methods and apparatus for transmitting and receiving frames on a local area network (LAN).

This invention relates particularly to methods and apparatus for controlling the receiving and transmitting of data frames into and from a bridge of the kind which interconnects two or more LANs and which operates in two different modes. In one mode the bridge retransmits a frame with a previously appended check sum. In the other mode the bridge responds to a query for information by generating a frame from an associated memory and by then computing and appending a frame check sum to that frame.

The present invention relates particularly to methods and apparatus for controlling the receiving and transmitting of data frames into and from a bridge of this kind. The present invention insures that the bridge receives all frames transmitted to it without the risk of loss of frames during any period of time in which the controller is being reprogrammed for a switch between the two different modes of operation.

This invention relates to a controller for a bridge of the kind disclosed in co-pending U.S. patent application Ser. No. 06/682,061 filed Dec. 14, 1984 entitled "Method and Apparatus for Bridging Local Area Networks" and assigned to the same assignee as the assignee of this invention. This co-pending U.S. patent application Ser. No. 06/682,061 is incorporated by reference in has been issued as U.S. Pat. No. 4,706,081 on Nov. 10, 1987, and this application in accordance with the provisions of the *Manual of Patent Examining Procedure,* Section 608.01(p)B.

Ethernet and IEEE 802.3 LANs are being installed in conjunction with a wide variety of office automation and data communication products. The LANs are used to locally interconnect a number of products built by numerous vendors (e.g. Digital Equipment Corporation, Intel, Ungerman/Bass, 3COM, etc.).

The LAN interface for LAN products is relatively simple. It always computes and appends a frame check sum (FCS) to transmitted frames and validates and removes the FCS from received frames. It cannot switch to transmitting a frame which already contains an FCS without the risk of not receiving frames simultaneously being transmitted by other stations on the LAN. Also, this interface is only required to receive LAN frames addressed to the product (not all LAN frames).

Devices which interconnect remote LANs and all the vendors' products attached to the remove LANs are termed data link bridges. Bridges have the unique LAN interface requirements addressed by this invention.

The invention relates particularly to transmitting frames on an Ethernet or IEEE 802.3 LAN. In particular, some transmitted frames already have an appended FCS value. In this case the interface must not compute and append a second FCS value. When the transmitted frame does not have an FCS value the interface must compute and append the FCS value.

The invention also relates particularly to receiving all frames transmitted by other stations on the LAN. The interface first computes and verifies that a received frame and its FCS value agree and then, if they do, the frame with its valid FCS is passed to the bridge.

It is an important objective of the present invention to attach data link bridges to Ethernet and 802.3 LANS.

It is a specific objective of the present invention to receive all frames transmitted on the LAN by other stations, back to back, or otherwise, while transmitting frames, some of which already contain the appended FCS value.

It is a related objective to compute and verify that each frame received from the LAN has a valid FCS value.

It is a related objective to discard each frame received from the LAN with an invalid FCS and to pass to the bridge all other of the received frames with their valid FCS values still appended.

It is a related objective to be able to switch between transmitting a frame already containing an FCS to transmitting a frame which must have the FCS computed and appended while continuing to receive all frames being transmitted by other stations on the LAN.

In the present invention there is a basic principle of operation involved in the operation of the interface.

This basic principle of operation is the ability to transmit both frames which already contain an FCS and frames which must have the FCS computed and appended while continuing to receive all frames being transmitted by the other stations on the LAN.

SUMMARY OF THE INVENTION

The problem addressed and solved by the present invention is the problem of changing modes in the interface of a bridge (of the kind which is used to connect one local area network (LAN) with another, possibly remote LAN) without losing frames. The two modes are (1) a first mode in which the bridge transmits a frame with a frame check sum previously appended and (2) a second mode in which the bridge must compute and then append a frame check sum on the end of the frame. The problem is changing between these two modes of operation of the bridge without concurrently losing frames or running the risk of losing frames which are to be transmitted through the bridge from one LAN to the other LAN.

The problem of possible loss of data arises because a bridge (of the kind to which the present invention relates) incorporates an interface which operates in two modes. In a first mode the bridge receives, from its associated stations or from another LAN frames which have a frame check sum appended so that the bridge does not have to compute and append the frame check sum to such frames. In a second mode, the bridge receives, from its associated stations, queries for information which is stored in memory associated with the bridge.

In this second mode of operation the bridge itself acts like another, normal station in that the bridge (1) obtains the requested information from the memory associated with the bridge, (2) then computes and appends the frame check sum to the generated data frames, and (3) then transmits the generated data frames and appended frame check sums to the station or stations which requested the information.

In the first mode the bridge does not have to compute and append a frame check sum on the end of the frame.

In the second mode of operation the bridge does have to compute and append the frame check sum on the end of each frame.

In the first mode of operation the bridge operates as a bridge to just check the frame check sums on the frames as received, and if the check sum is valid, the controller of the bridge passes it to the bridge and the bridge then forwards that frame for its intended destination.

In the second mode of operation, a station is talking to the bridge and not through the bridge. The station essentially is interrogating the bridge for some network management, statistical or accounting type information. The bridge in the second mode is operating to originate information that is transmitted back to the inquiring station.

In switching between a condition of operation in which the circuitry merely transmits data (with a routine check for validity) to a condition of operation in which the circuitry must generate and append frame check sum data the controller for the bridge is off line for a period of about 24 microseconds. This amount of time off line is required to reprogram from the first mode to the second mode and vice versa. During this approximately 24 microsecond period of time there is a window of opportunity in which it is possible to miss frames which are to be forwarded through the bridge between one LAN to another, remote LAN.

The present invention overcomes the problem of loss of frames (which could result from a controller which is off line while it is being programmed as described above) by using two separate receive and transmit circuits, or chips, in the controller for each bridge.

The receive circuitry or chip is constructed and operated so that is always receiving and is never reprogrammed.

The transmit circuitry is reprogrammable to function in two modes. In one mode it generates and adds a frame check sum to the frame. In the second mode the transmit circuitry transmits frames which already have the frame check sums on the frames. In the second mode the transmit circuitry does not generate or add a frame check sum to the frame.

With this construction it is never necessary to reprogram the receive side, so the receive side continues to receive frames without loss. The only reprogramming required is reprogramming for the transmit side.

Since the receive side is never off line, because it is never reprogrammed, there is no time for missing frames which are to be forwarded from one station in a local or remote LAN to another station in a remote or local LAN.

Bridge controller apparatus and methods which incorporate the structure and techniques described above and which are effective to function as described above constitute further, specific objects of this invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIGS. 5-1 to 5-4 show details of the bridge interface part of the controller for the bridge shown in FIG. 4. FIG. 5 is separated into four separate drawings (FIGS. 5-1, 5-2, 5-3 and 5-4) in order to make the details of the lettering easily readable. In FIG. 5 (as shown on the original drawings) the line from the pin 1 of the chip F373 K9D2 shown in FIG. 5-1 is the line which connects to the pin 11 of the chip LS32 shown at the top of FIG. 5-2, and the line from the pin 1 of the lower chip F373 L3D2 in FIG. 5-1 is the line which connects to the pin 8 of the lower chip LS32 in FIG. 5-2. The LSN DAL bus shown in FIG. 5-1 continues through FIG. 5-2 and is the bus which extends along the right hand side of the LS244 chips M3D2 and M8D2 in FIG. 5-3. The line which extends from pin 2 of the F32 switch K5J9 in FIG. 5-3 is the line which connects to the 621 pin entitled "LAN READ" in FIG. 5-4. The line which extends from the pin A17 entitled "LAN RDHI" in FIG. 5-4 connects to the line which extends through the upper right hand corner of FIG. 5-3 and to the pin 9 of the switch of the LS32 switch L3E5 in FIG. 5-2.

FIGS. 6-1 to 6-4 show details of the two chip assembly part of the controller for the bridge shown in FIG. 4. FIG. 6 is shown as four separate FIGS. (6-1, 6-2, 6-3 and 6-4) in order to make the numberals and letters large enough to be readily readable. In FIG. 6-1 (as shown in the original drawings) the two vertically extending lines at the left hand side of the FIG. 6-1 are the same two vertically extending lines at the left hand side of FIG. 6-2. The five lowermost lines in the bottom right hand side of FIG. 6-2 are the same lines as the five lowermost lines at the left hand side of FIG. 6-3. The lines numbered respectively 19, 18, 17 and 16 of the LAN ADR bus (indicated by the legend at the lower right hand side of FIG. 6-4) connect respectively to the pins A19, A18, A17 and A16 of the chip A79990 XMT KOC5 shown in FIG. 6-3.

Figure 1:
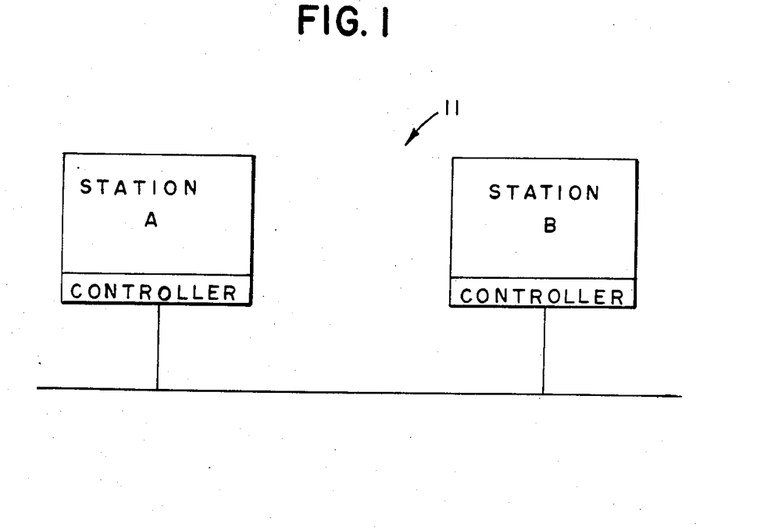
FIG. 1 shows two stations connected for communication with one another, on a local area network, by controllers in the stations.

DETAILED DESCRIPTION OF THE PREFERRED EMBODIMENTS:

In FIG. 1 a local area network (LAN) is indicated generally by the reference numeral 11 and is shown as comprising two stations (station A and station B).

From this point on in the description, the network will be described as an Ethernet network, but it will be apparent from the description to follow that the principles of the invention are applicable to networks other than just the Ethernet type of network.

In FIG. 1 when station A sends a frame to station B, the Ethernet controller for station A takes the information station A has generated and creates essentially an Ethernet frame out of it. A frame check sum is computed and appended to the end of the frame and the frame and appended frame check sum are transmitted across the Ethernet network. Station B essentially receives that frame because the frame is addressed to station B specifically. The Ethernet controller for station B checks the frame check sum. If the check sum is bad, the frame is discarded. If the frame check sum is valid, the controller for station B passes the information to station B to process.

Figure 2:
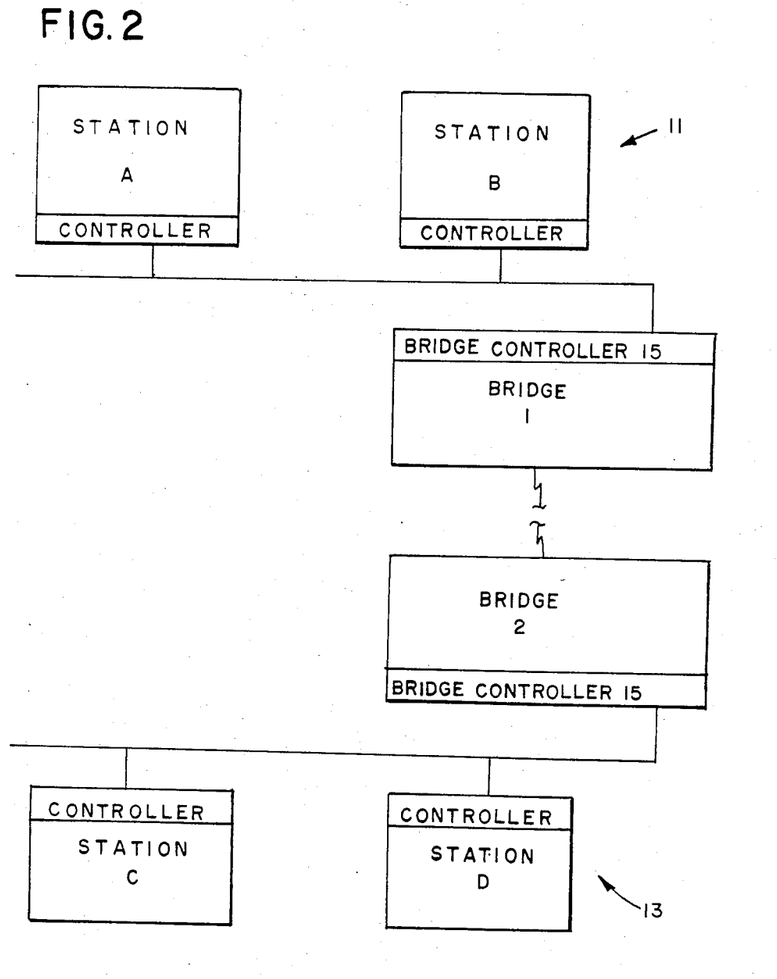
FIG. 2 is a view showing two local area networks connected by bridges so that one station in one local area network can transmit data frames through the bridges to one or more stations in the other local area network. In a station to station transmission of this kind the bridges transmit, but do not generate, frame check sums.

FIG. 2 shows two Ethernet networks 11 and 13, of the kind illustrated and described above with reference to FIG. 1, which are connected across some long haul medium by a bridge 1 and a bridge 2.

Bridges 1 and 2 interconnect the two LANS (the LAN 11 having station A and station B and the LAN 13 having stations C and D). Both the controller for bridge 1 and the controller for bridge 2 must receive everything that is transmitted on its associated local Ethernet, and each bridge must also receive everything independent of address.

Bridge 1, when operating as a bridge, operates in a mode of operation in which the controller for the bridge would essentially check frame check sum; and if the frame check sum is not valid, the bridge controller 15 discards the frame. If the frame check sum is valid, the bridge controller 15 passes the frame and frame check sum to the bridge B1. If the frame in this particular case is addressed from station A to station D, bridge 1 would forward that frame across the long haul network to bridge 2.

Bridge 2 would then hand the frame to its Ethernet controller for transmission across the associated Ethernet to station D. The frame check sum that was originally generated by station A in this case travels transparently through the controllers. The controllers do not have to operate in a mode in which the controllers of the bridges append a frame check sum on the end of the frame.

The frame check sum that station A generated in this case travels all the way to station D. The only check on the frame check sum was a check for validity. The controllers for the bridges in this case do not append or compute another frame check sum.

Figure 3:
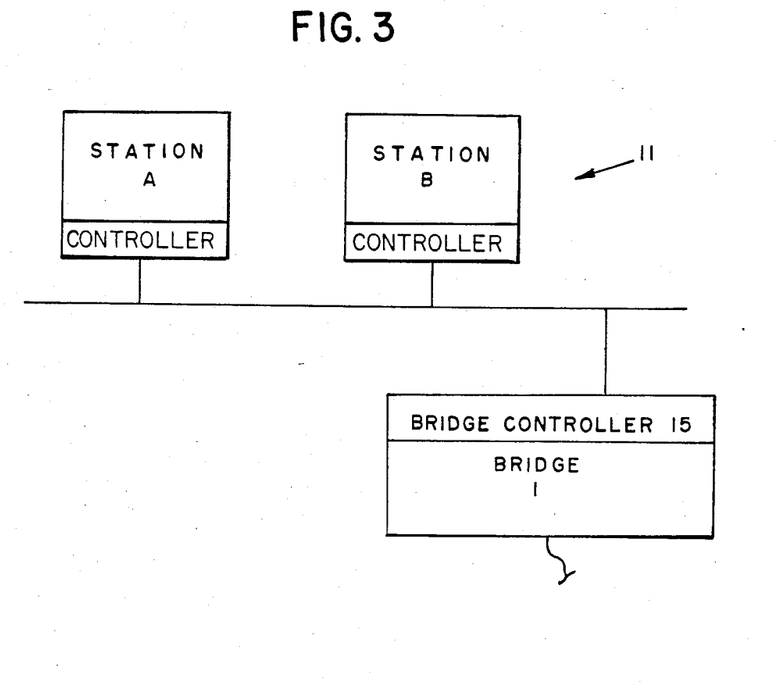
FIG. 3 is a view showing how stations in a local area network can communicate with a bridge associated with the local area network in a mode of operation in which a station interrogates the bridge for network management type information stored in memory in the bridge. The bridge, in this case, generates and appends frame check sums for the information sent back to the station.

Referring now to FIG. 3, a condition of operation will be described in which the bridge controller 15 for the bridge 1 is required to generate and to append a frame check sum to a frame.

Let us assume that station B, in this instance, in addition to wanting to communicate from time to time with station A, also wants to talk to the bridge 1, not through the bridge but to it. The station, when talking to the bridge, essentially interrogates the bridge for some work management type information, statistical information, accounting type of information, etc. In this situation the bridge must operate to originate information.

In this situation a problem could arise when the bridge 1 responds to the request for information, because the bridge 1 must begin to operate as a normal Ethernet station for purposes of responding. The bridge 1 must, in response to the request for information from the associated station, obtain the information from an associated memory and then must generate and append a frame check sum to the information to be transmitted back to the station which requested the information.

Operation in this mode requires a reprogramming of the bridge controller 15, as compared to the programming existing for the condition of operation in which the bridge merely transmits frames with previously appended check sums.

Figure 4:
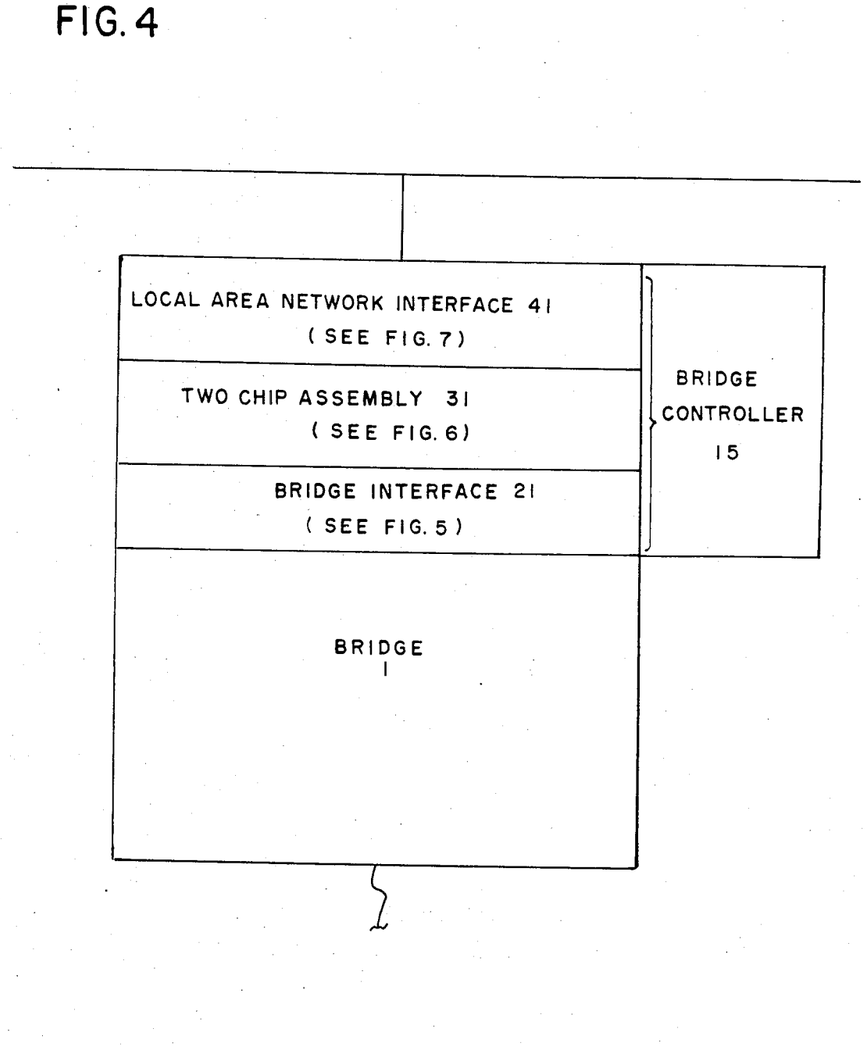
FIG. 4 is a view showing how the controller of the bridge shown in FIG. 3 comprises, in accordance with one embodiment of the present invention, a bridge interface, a two chip assembly, and a local area network interface.

FIG. 5 shows details of the bridge interface part of the bridge controller 15 shown in FIG. 4. In FIG. 5 the bridge interface is indicated by the general reference numeral 21.

FIG. 6 shows details of the two chip assembly portion of the bridge controller 15, and this two chip assembly is indicated generally by the reference numeral 31 in FIGS. 6 and 4.

Figure 7:
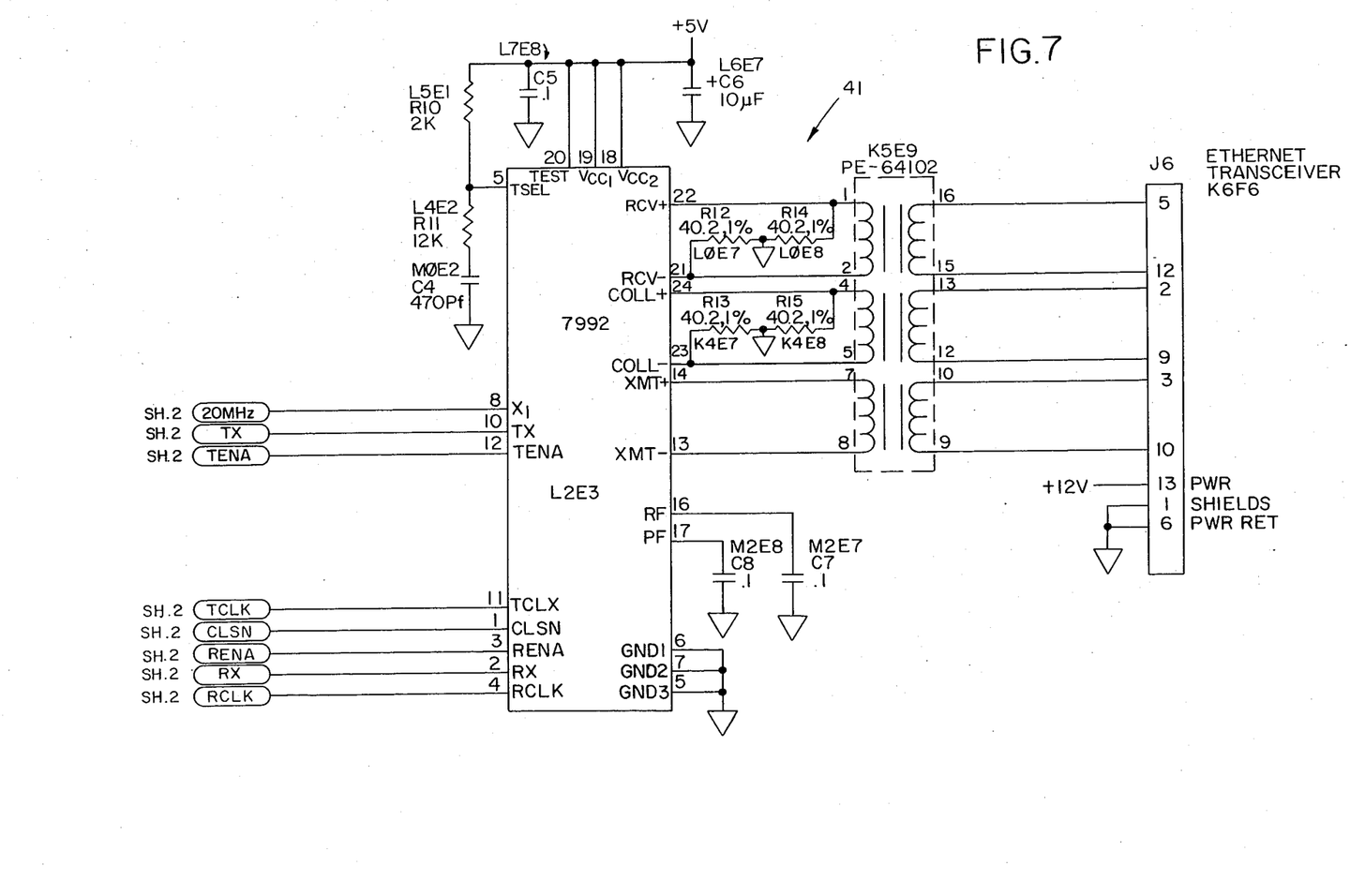
FIG. 7 shows details of the local area network interface part of the controller for the bridge shown in FIG. 4.
Figure 51:
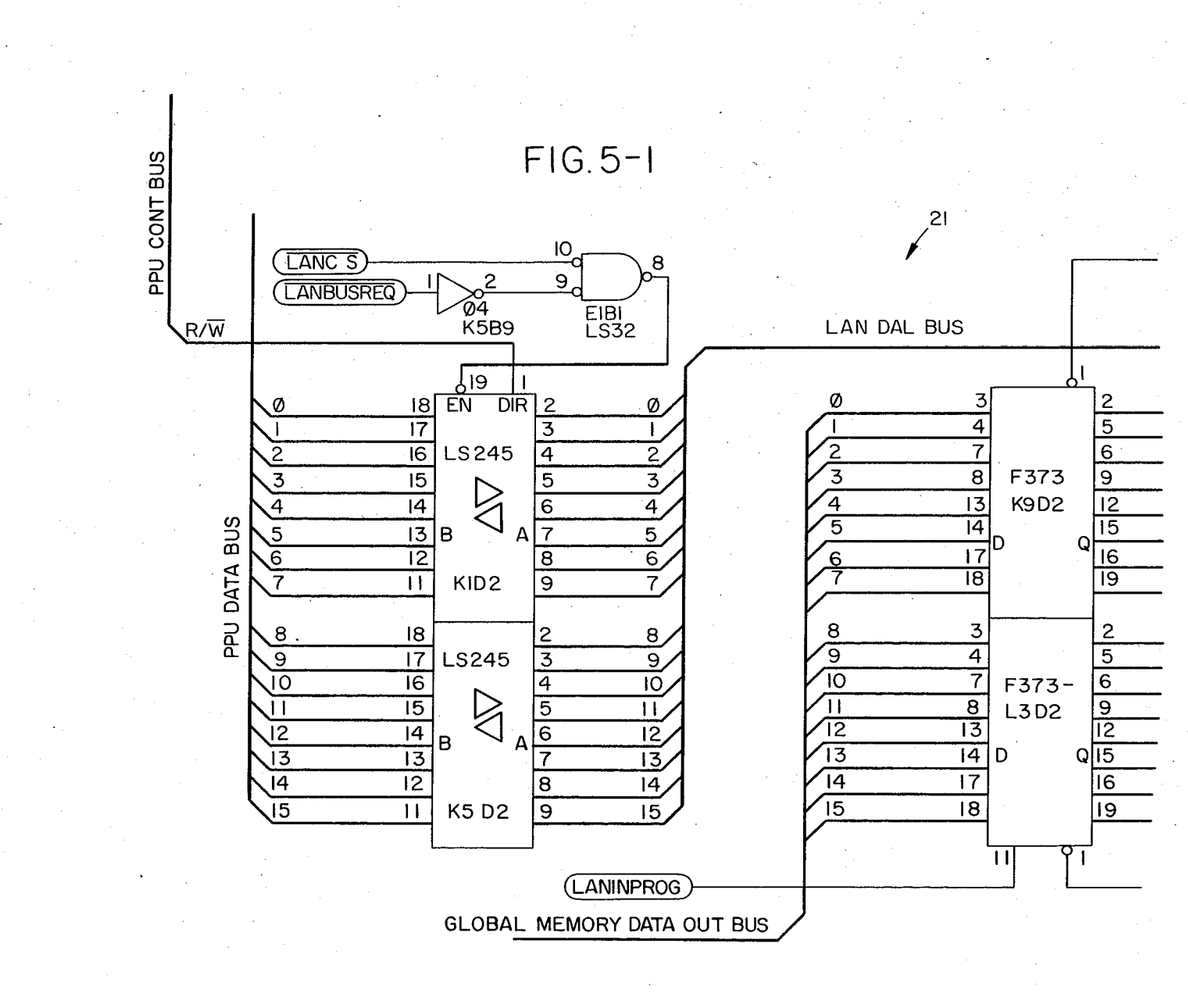
Figure 52:
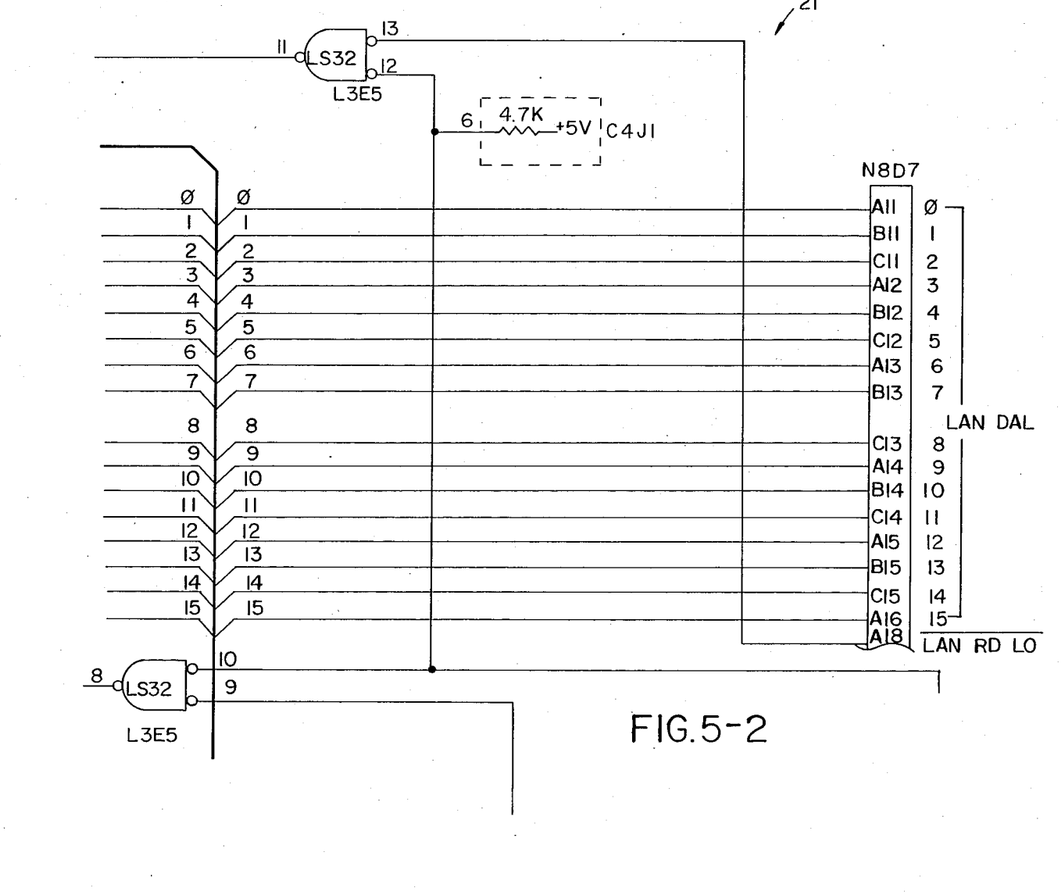
Figure 53:
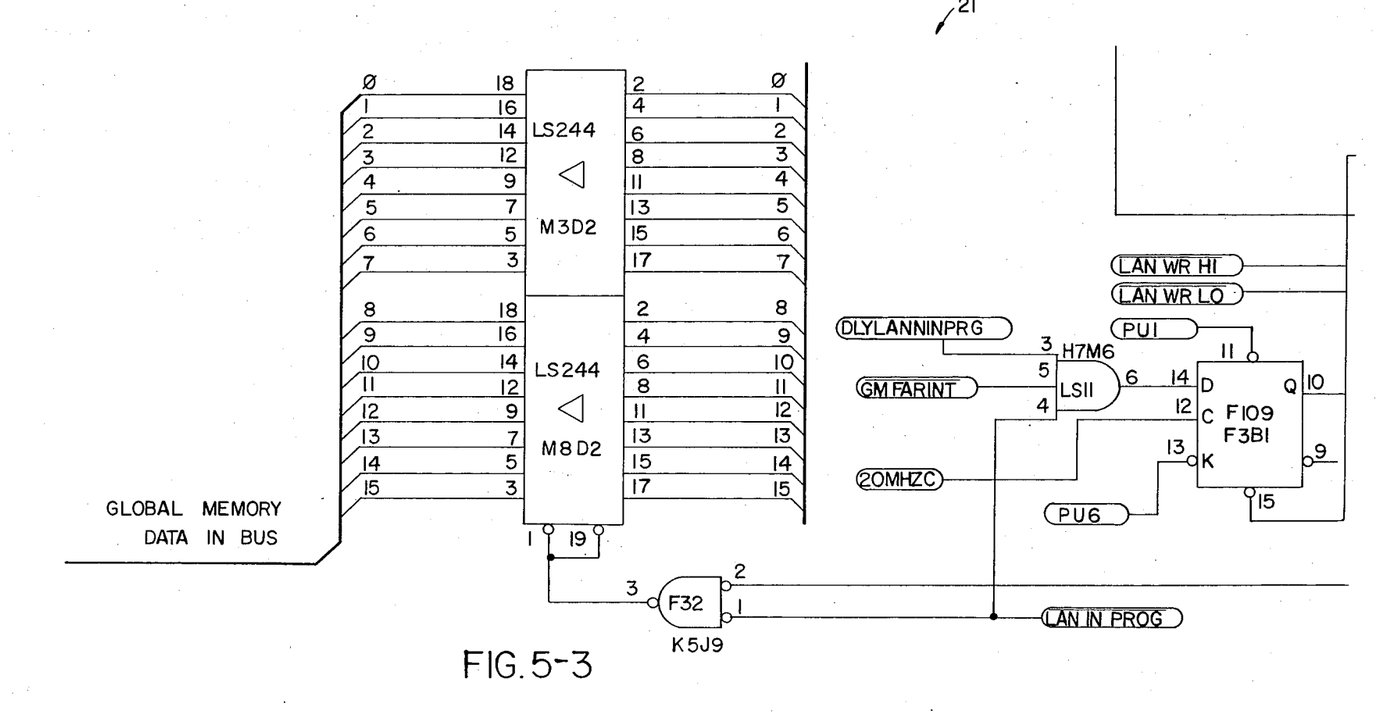
Figure 54:
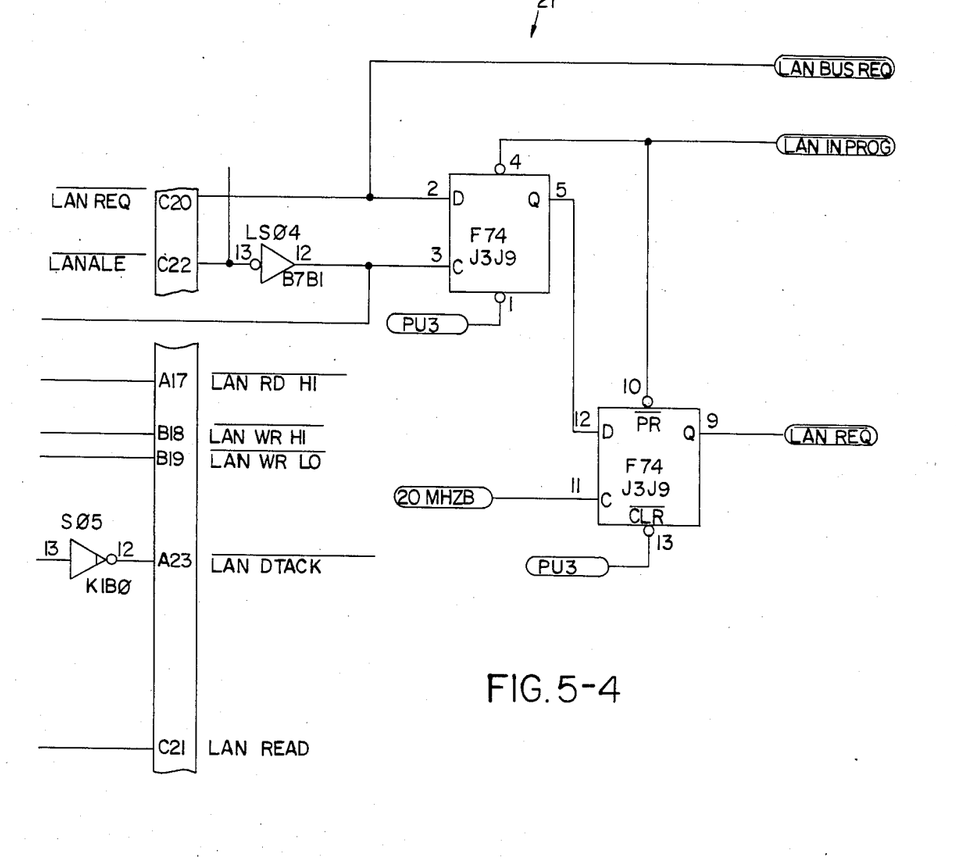
Figure 61:
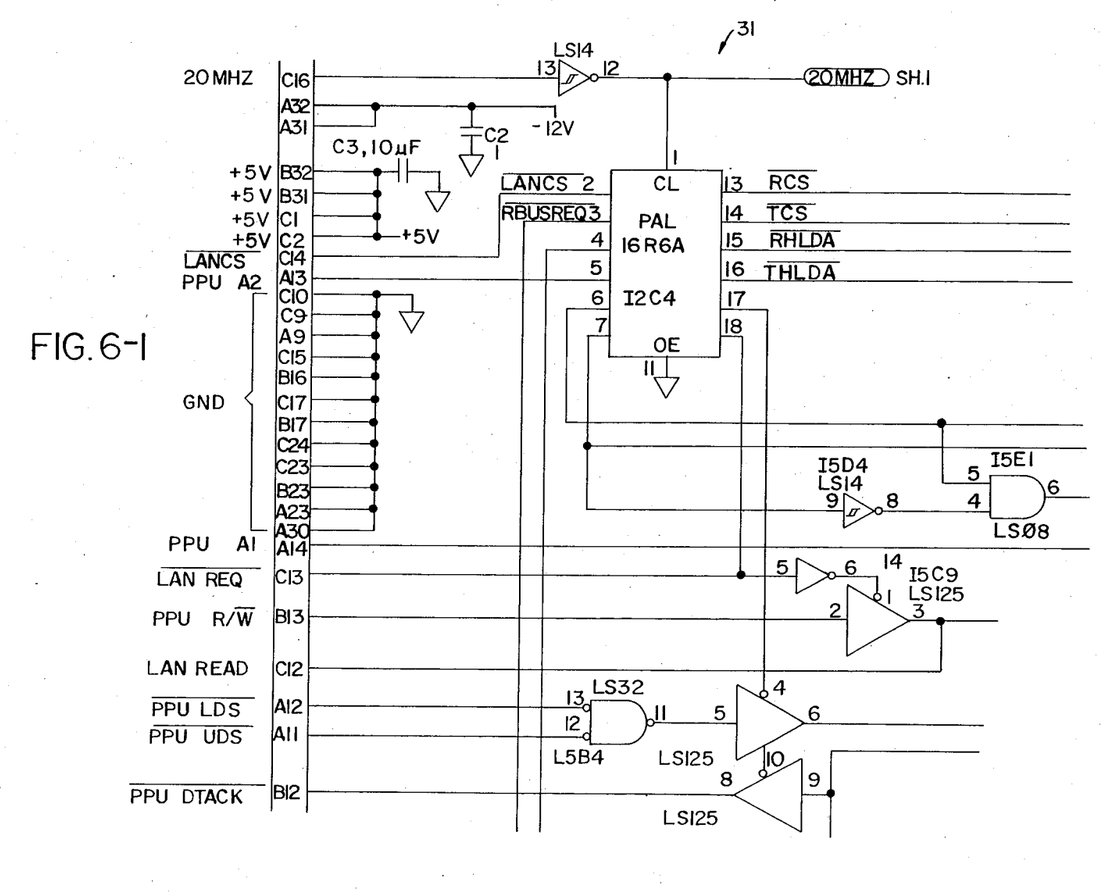
Figure 62:
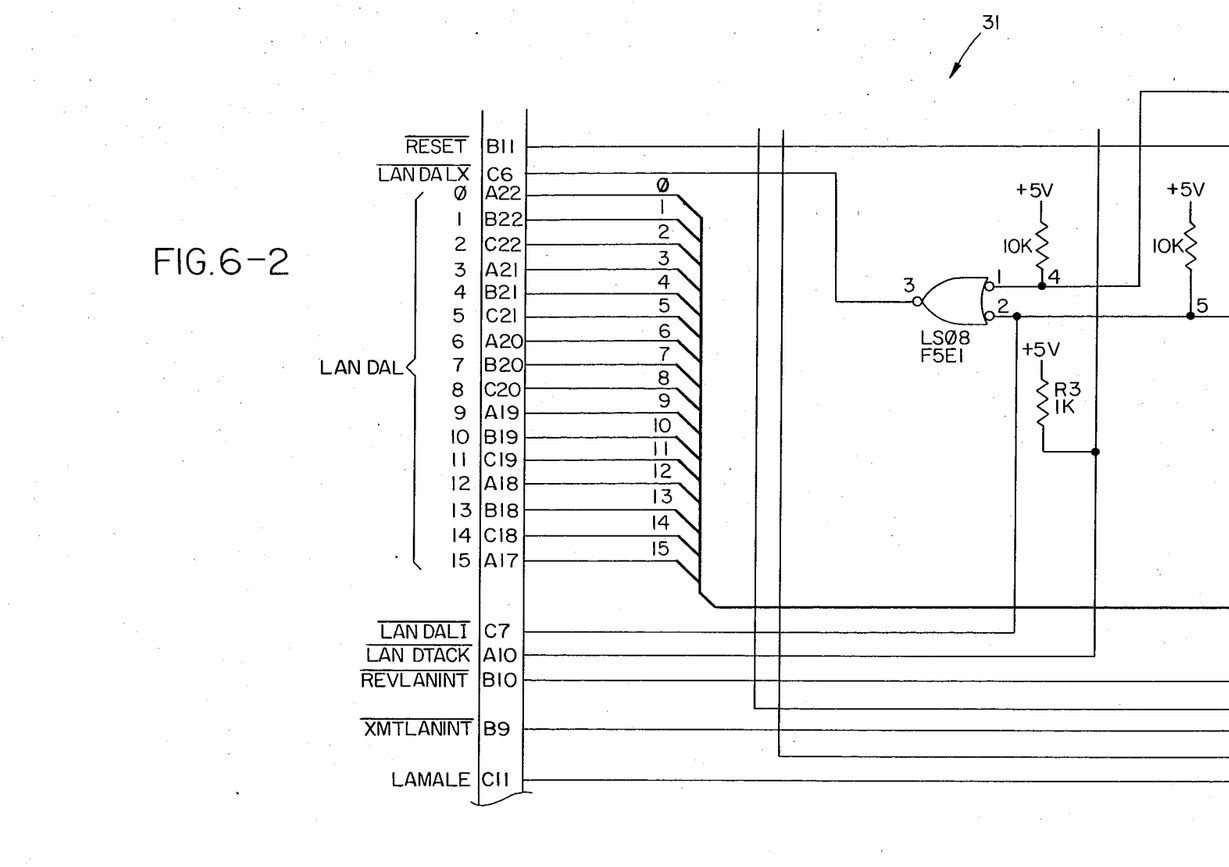
Figure 63:
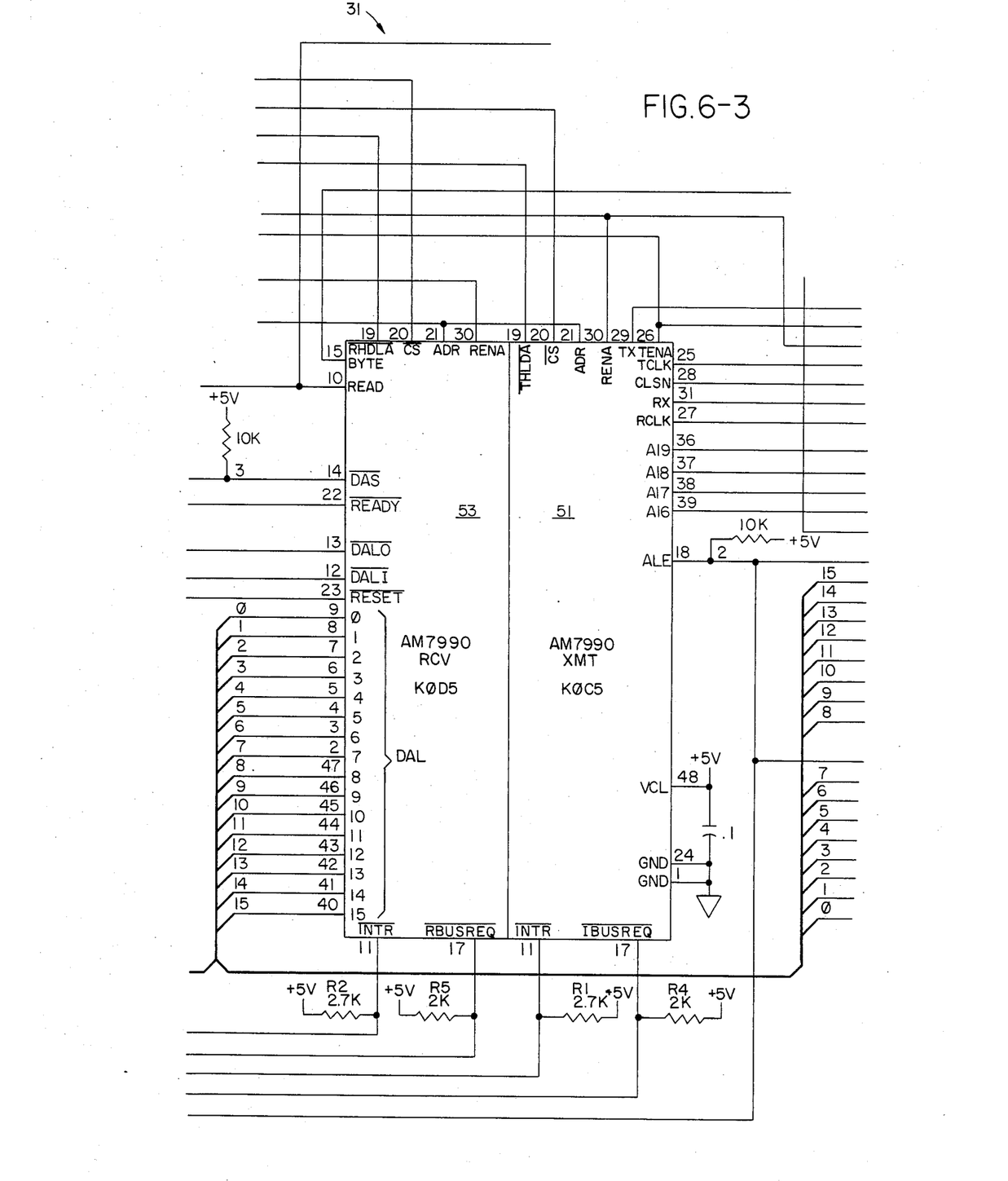
Figure 64:
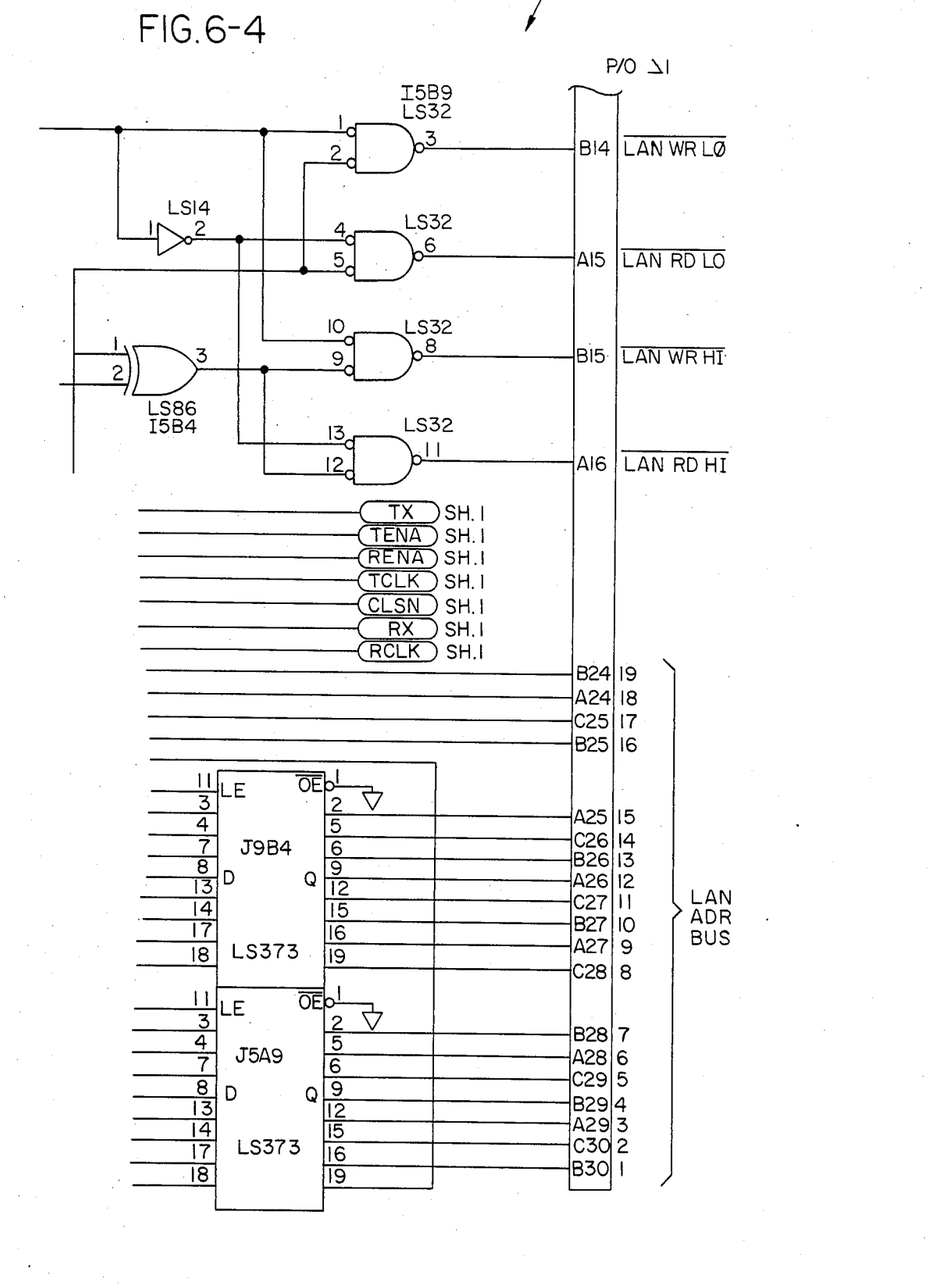

FIGS. 5, 6 and 7 are quite detailed drawings containing legends in conventional electrical engineering terminology for circuit components and control lines and connections. This conventional electrical engineering terminology will be followed and utilized in the detailed textual description below.

In one specific embodiment of the present invention the bridge controller 15 shown in FIG. 4 is an Ethernet-/IEEE 802.3 interface controller which is programmed by a Motorola 68010 processor (termed the Peripheral Processing Unit or PPU) as a slave device and is thus a PPU bus peripheral. The PPU itself is not shown in the drawings, but the control and signal lines for the PPU are indicated by the letters PPU. The controller also transfers data to and from global memory functioning as a master device.

The, left portion of FIG. 5 is the PPU slave interface. When the PPU decodes a LAN peripheral address, LANCS/ is asserted and this enables bus transceivers K1D2 and K5D2. (The LAN DAL bus is the data bus.) These transceivers are inhibited (via LANBUSREQ/) if the LAN is presently requesting the global memory bus. The control lines (LDS, UDS, DTACK/, R/W, and the two lower address lines) are directly coupled to the LAN card (upper left of the figure).

The vast majority of communication with the LAN interface is through tables and buffers in the global memory. The LAN interface then becomes a high priority requester for the global memory. When the LANCE (LAN controller chip) requests a master DMA transfer, it asserts LANREQ/ and begins a DMA cycle by asserting LANALE/. This is latched by the first half of J3J9. This half asserts the global memory request, LANREQ/.

When the LAN request is granted, LANINPROG/ becomes true. If the LAN is writing to the global memory, buffers M3D2 and M8D2 are enabled. On a read, the data storage latches at K9D2 and L3D2 are driven onto the LAN DAL (data) bus appropriately for a high or low byte read. DTACK/ to the LANCE chips is withheld until the end of the global memory cycle (for other requesters, DTACK/ is provided at CAS time). This allows time for the parity check logic to stabilize. If no parity error has occurred, FF F3B1 is set and DTACK/ is buffered to the LANCE chips. If a parity error did occur, the DTACK/ latch is not set and the LANCE chips will time out. This prevents bad data from being sent to the Ethernet/IEEE 802.3 LAN. The DTACK/ latch is reset (in both cases) by the LANCE terminating the cycle by dropping ALE/.

The Am7990/91 LANCE and SIA are utilized for the LAN interface. The LANCE contains both its own FIFO and DMA controller. As a slave peripheral, it is attached to the PPU bus. When operating as a master to transfer data, it deposits directly into the global RAM memory.

The LAN interface must be able in some cases to transmit a prepended FCS (CRC) value without alteration. In order to accomplish this, the self generation CRC of the LANCE must be defeated when transmitting LAN these type of frames. For all other frames the LANCE must generate the CRC value and append it to the frame. Unfortunately, the LANCE must be reinitialized to change between these modes. This has the potential problem causing a frame to not be received while the LANCE is being reinitialized.

The solution to this problem is to use 2 LANCE chips 51 and 53 (see FIG. 6), one for transmit and one for receive. The receive LANCE is programmed to always pass the receive CRC through to memory. Since transmit timing is under local controls, the transmit LANCE can be programmed to either retransmit the prepended CRC or append an internally generated CRC value. This switch can be made without the possible loss of incoming data since the receive LANCE is not effected by reprogramming the transmit LANCE.

As shown in FIG. 6 the two LANCE chips form the interface between the Ethernet/IEEE 802.3 transceiver and the PPU global memory. To examine the operation in detail, these two interfaces can be treated separately. FIG. 6 shows the LANCE chips and the PPU global memory interface.

The two LANCE chips are connected together pin for pin except for a few control signals. When a LANCE is idle, (i.e. not functioning as a master or not addressed as a slave), its output pins are tri-stated thus allowing the interconnect.

The LANCE chips have a multiplexed address and data bus (the DAL bus). This DAL bus is connected directly to the PPU global memory for data transfers and is demultiplexed by J9B4 and J5A9 latches. The higher 4 address lines (A19:16) are not multiplexed. (A23:20 are not used since all master transfers are assumed to be from 20000-2FFFFFH.)

The LANCE chips function as either slaver peripherals to the PPU or as masters for the global memory. Since these two functions are asynchronous and mutually exclusive, an arbitration scheme is required. This is simply accomplished by the PAL at I2C4. Its inputs are the PPU's slave request (LANCS/) and the two master requests from the LANCEs (RBUSREQ/-receiver bus request and TBUSREQ/—transmitter bus request). The PAL provides the two slave chip select, FCS/ and TCS/ as well as the master bus acknowledges, RHLDA/and THLDA/. In addition, two control signals are provided for enabling the control signal steering buffers.

The PAL will provide the appropriate slave chip select when the PPU has requested the LANCE if neither LANCE is functioning as master. Conversely, the LANCESs will be granted master control (xHLDA/) if there is no pending PPU request. The receive LANCE has master priority and will be granted the bus over a transmit request. The transmitter will only be granted the bus when a receiver request is not pending and there is no incoming signal (i.e. RENA is inactive).

As a PPU slave, the control signals from the PPU are inputs to the LANCE. An LS125 buffer at I5C( drives READ from the PPU's R/W and READY is driven back to the PPU's DTACK/. The two data strobes (LDS/ and UDS/) are gated together by L5B8 since only word transfers are allowed. Together they form the DAS/ strobe. The appropriate chip select is generated by the PAL (I2C4) based upon PPU address A2. The PPU A1 line performs register selection within the LANCE.

In the master mode, separate high and low read and high and low write signals are generated by I5B9 for the global memory data bus steering.

The LANCE chips provide a companion interface for the LANCE transceiver chip, the 7992B. This chip provides the encoding/decoding and well the cable drivers/ receivers. The interface was designed for the 7990 LANCE. The schematic is shown in FIG. 7.

The transceiver cable is directly driven by the 7992B through a transformer. The only other signal provided is the +12 v DC power. The LANCE interface is also directly connected with:
TX Transmit Data
RX Receive Data
TENA Transmit enable
RENA Receiver enable
TCLK 10 MHz master timing for the LANCE chips
RCLK Receiver clock for incoming signal
CLSN Collision signal The only modification to the direct coupling of the LANCE and the 7992B is with the receiver's RENA. During transmit TENA is enabled by the transmitter LANCE and RENA becomes active from the transceiver's detection of carrier shortly afterward.

An AND gate at I5E1 (FIG. 6) is useful to inhibit RENA from the receive LANCE when TENA is active to insure that any latent bugs in the receive LANCE do not cause erroneous reporting of silo overflows.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A controller for a bridge of the kind which interconnects two or more local area networks and which operates in a promiscuous receive and transmit mode to receive station data frames with appended frame check sums from stations in one local area network and to transmit the station data frames and appended frame check sums to one or more stations in another local area network while essentially passing the existing, appended frame check sums through the bridge without change and which also operates in a bridge management mode to receive requests for information from stations in a local area network and to respond to the requests by generating management data frames from an associated memory and by computing and appending frame check sums to the generated management data frames and by then transmitting the generated management data frames and appended frame check sums to the stations which requested the information, said controller comprising, bridge interface means for interfacing the controller with an associated bridge, local area network interface means for associating the controller with an associated local area network, first circuit means and second circuit means operatively associated with the bridge interface means and the local area network interface means, said first circuit means comprising a circuit which can be reprogrammed and which is effective to transmit both the station data frames which have existing appended frame check sums and the management data frames which have the computed appended frame check sums, said second circuit means comprising a circuit which is not reprogrammable and which is effective to receive all station data frames and existing appended frame check sums so that the controller for the bridge is always in a state in which the controller can receive information and all station data frames transmitted from stations to the bridge are received by the bridge without interruption or loss of any such station data frames and programming means for programming the first circuit means in the promiscuous mode to retransmit station data frames with the existing prepended frame check sum and in the management mode to append the computed frame check sum before transmitting the frame.

2. The invention defined in claim 1 including a plurality of local area networks and one or more bridges interconnecting the local area networks and wherein each bridge has a separate controller as defined in claim 1 for each local area network directly associated with that bridge.

3. The invention defined in claim 2 wherein at least one of the local area networks is an Ethernet local area network.

4. The invention defined in claim 2 wherein at least one of the local area networks is an IEEE 802.3 local area network.

5. A controller for a bridge of the kind which interconnects two or more local area networks and which operates in a promiscuous receive and transmit mode to receive station data frames with appended frame check sums from stations in one local area network and to transmit the station data frames and appended frame check sums to one or more stations in another local area network while essentially passing the existing, appended frame check sums through the bridge without change and which also operates in a bridge management mode to receive requests for information from stations in a local area network and to respond to the requests by generating management data frames from an associated memory and by computing and appending frame check sums to the generated management data frames and by then transmitting the generated management data frames and appended frame check sums to the stations which requested the information, said controller comprising, bridge interface means for interfacing the controller with an associated bridge, local area network interface means for associating the controller with an associated local area network, first circuit means and second circuit means operatively associated with the bridge interface means and the local area network interface means, said first circuit means comprising a circuit which can be reprogrammed and which is effective to transmit both the station data frames which have existing appended frame check sums and the management data frames which have the computed appended frame check sums, said second circuit means comprising a circuit which is not reprogrammable and which is effective to receive all station data frames and existing appended frame check sums so that the controller for the bridge is always in a state in which the controller can receive information and all station data frames transmitted from stations to the bridge are received by the bridge without interruption or loss of any such station data frames, programming means for programming the first circuit means in the promiscuous mode to retransmit station data frames with the existing prepended frame check sum and in the management mode to append the computed frame check sum before transmitting the frame, and wherein the programming means reinitialize the first circuit means each time there is a change from one mode to the other mode, buffer means for storing, during the time period of reinitialization, the frames to be transmitted, and local control means for controlling the transmit timing of the stored frames during and after the periods of reinitialization.

6. A method of controlling the receiving and transmitting of data frames into and from a bridge of the kind which interconnects two or more local area networks and which operates in a promiscuous receive and transmit mode to receive station data frames with appended frame check sums from stations in one local area network and to transmit the station data frames and appended frame check sums essentially unchanged through the bridge to one or more stations in another local area network and which also operates in a bridge management mode to receive requests for information from stations in a local area network and to respond to the requests for information by generating management data frames from an associated memory and by computing and appending frame check sums to the generated management data frames and by then transmitting the generated management data frames and appended frame check sums to the stations which requested the information, said method of controlling comprising, transmitting through a first circuit means which can be reprogrammed both the station data frames which have existing appended frame check sums and the management data frames which have the computed appended frame check sums, receiving through a second circuit means which is not reprogrammable all station data frames and existing appended frame check sums so that the controller for the bridge is always in a state in which the controller can receive information and all station data frames transmitted from stations to the bridge are received by the bridge without interruption or loss of any such station data frames and programming the first circuit means in the promiscuous mode to retransmit station data frames with the existing prepended frame check sum and in the management mode to append the computed frame check sum before transmitting the frame.

* * * * *

Disclaimer and Dedication 4,809,265—John H. Hart, San Jose; Frederick J. Baker, Santa Clara, both of Calif. METHOD AND APPARATUS FOR INTERFACING TO A LOCAL AREA NETWORK. Patent dated Feb. 28, 1989. Disclaimer and Dedication filed Dec. 24, 1997, by the assignee, Vitalink Communications Corp.

Hereby disclaims and dedicates to the public all claims of said patent.
*(Official Gazette,* February 24, 1998)